United States Patent [19]

Yamaguchi et al.

[11] Patent Number: 4,923,140
[45] Date of Patent: May 8, 1990

[54] BAIL REVERSING APPARATUS FOR FISHING SPINNING REELS

[75] Inventors: Nobuyuki Yamaguchi; Masayuki Kawashiro, both of Tokyo, Japan

[73] Assignee: Daiwa Seiko, Inc., Tokyo, Japan

[21] Appl. No.: 247,433

[22] Filed: Sep. 9, 1988

[30] Foreign Application Priority Data

Feb. 5, 1988 [JP] Japan .................................. 63-14393
May 13, 1988 [JP] Japan .................................. 63-63045

[51] Int. Cl.$^5$ ............................................. A01K 89/01
[52] U.S. Cl. ..................................... 242/230; 242/233
[58] Field of Search ................. 242/232, 230, 231, 233

[56] References Cited

U.S. PATENT DOCUMENTS

| | | | |
|---|---|---|---|
| 4,095,756 | 6/1978 | Morishita | 242/84.2 G |
| 4,256,271 | 3/1981 | Ruin | 242/84.2 G |
| 4,337,905 | 6/1982 | Sazaki | 242/84.2 G |
| 4,502,645 | 3/1985 | Sazaki et al. | 242/84.2 G |
| 4,526,327 | 7/1985 | Sazaki | 242/84.2 G |
| 4,527,752 | 7/1985 | Maruyama et al. | 242/84.2 G |

FOREIGN PATENT DOCUMENTS 55894 4/1977 Japan .

Primary Examiner—Donald Watkins
Attorney, Agent, or Firm—Browdy and Neimark

[57] ABSTRACT

A bail reversing apparatus of the invention has an abutting member formed on the reel body which is made to abut against a kick member to turn the kick member and thereby return the bail support member to the reel-up position. This enables efficient, quick and smooth reversing of the bail support member and does not require high precision in machining the kick member. The apparatus is also characterized in that the kick member is, either directly or through a working rod, connected to the bail support member, so that the reversing mechanism becomes very simple contributing to further reductions in the weight and size of the rotor.

5 Claims, 6 Drawing Sheets 4,923,140

1

BAIL REVERSING APPARATUS FOR FISHING SPINNING REELS

FIELD OF THE INVENTION

This invention relates to an improvement in a bail reversing apparatus for fishing spinning reels.

BACKGROUND OF THE INVENTION

A conventional bail reversing apparatus for fishing spinning reels is disclosed in the Japanese Utility Model Laid-Open No. 55894/1977. In this apparatus for reversing the bail from the reel-off position to the reel-up position, a working rod is connected to a bail support member rotatably mounted on the bail support arm. When the bail is to be moved to the reel-off position, the working rod is slid so as to project out from the rear end surface of the bail support arm. When the bail is to be returned to the reel-up position, the projecting end of the working rod is pushed inwardly by a cam provided to the reel body by utilizing the rotation of a rotor to rotate the bail support member.

The above bail reversing apparatus, however, has the drawback that since the working rod is slid by the cam of the reel body in the direction perpendicular to the direction of rotor rotation, the operation is heavy and has low efficiency. Moreover, the cam is easily worn and also requires high precision for machining.

In light of these drawbacks, this invention has been achieved to provide a bail reversing apparatus in which an abutting member for returning the bail support member and provided to the reel body is made to rotate a kick member rotatably mounted on the bail support arm to cause the bail support member to return to the reel-up position.

Another object of the invention is to provide a bail reversing apparatus in which the kick member rotatably mounted on the bail support arm is made to project at one end from the base end surface of the bail support arm when the bail support member is in the reel-off position; in which the other end of the kick member is, either directly or through the working rod, connected to the bail support member so as to reduce the frictional resistance between the abutting member on the reel body and the pivoting kick member when they are in contact thereby effectively, smoothly and quickly returning the bail support member to the reel-up position; and in which the abutting member on the reel body and the abutting portion of the kick member do not require high precision for machining, simplifying the structure of the apparatus.

A second feature of the present invention lies in that the distributed urging of the bail support member to the reel-up position and the reel-off position by the spring member makes it possible to conduct two reverse return operations of returning the ball located at the reel-off position to the reel-up position directly by hand and returning to same in linkage with the rotating operation of the rotor linking with a handle operation, which are the characteristics thereof, while this distributed urging operation by the spring member and the setting of the abutting position of the kick member against the abutting element for return at the extension of the base of the ball support arm make it possible to realize a smooth and quick return operation of the bail support member to the reel-up position with smaller loss in transmitting force and smaller shock.

A third feature of the present invention lies in that, since the bail support member and the kick member disposed in the bail support arm are coupled by means of the engagement of the circular-arc-shaped long groove made in one of these members with the projection provided directly or through the working rod in the other, the rotational angle of the bail support member can be made larger than that of the kick member, and thereby the bail of the bail support member made to return reversely in a smooth and quick manner by the aforesaid kick member can be held at each of positions whereat the fishing line is easy to reel up and off, so that the fishing line can be reeled up and off smoothly and quickly.

Another feature of the present invention lies in that since the bail support member and the kick member are coupled with each other in the bail support arm through the intermediary of the working rod and accommodated in said arm make, the diversification of the form of a reel can be met by only changing the length of the working rod even when the bail support arm is long or short according to variations in the form of the reel or the amount of winding of a spool.

Still another object of this invention is to provide a bail reversing apparatus in which the kick member is directly coupled to the bail support member so that the reversing mechanism requires only the kick member rotatably mounted on the bail support arm in addition to the abutting member on the reel body, thereby making a further reduction in the number of parts and making the construction simpler, which will lead to a further reduction in the thickness of the bail support arm and in the size and weight of the rotor.

DETAILED DESCRIPTION OF THE INVENTION

Figure 1:
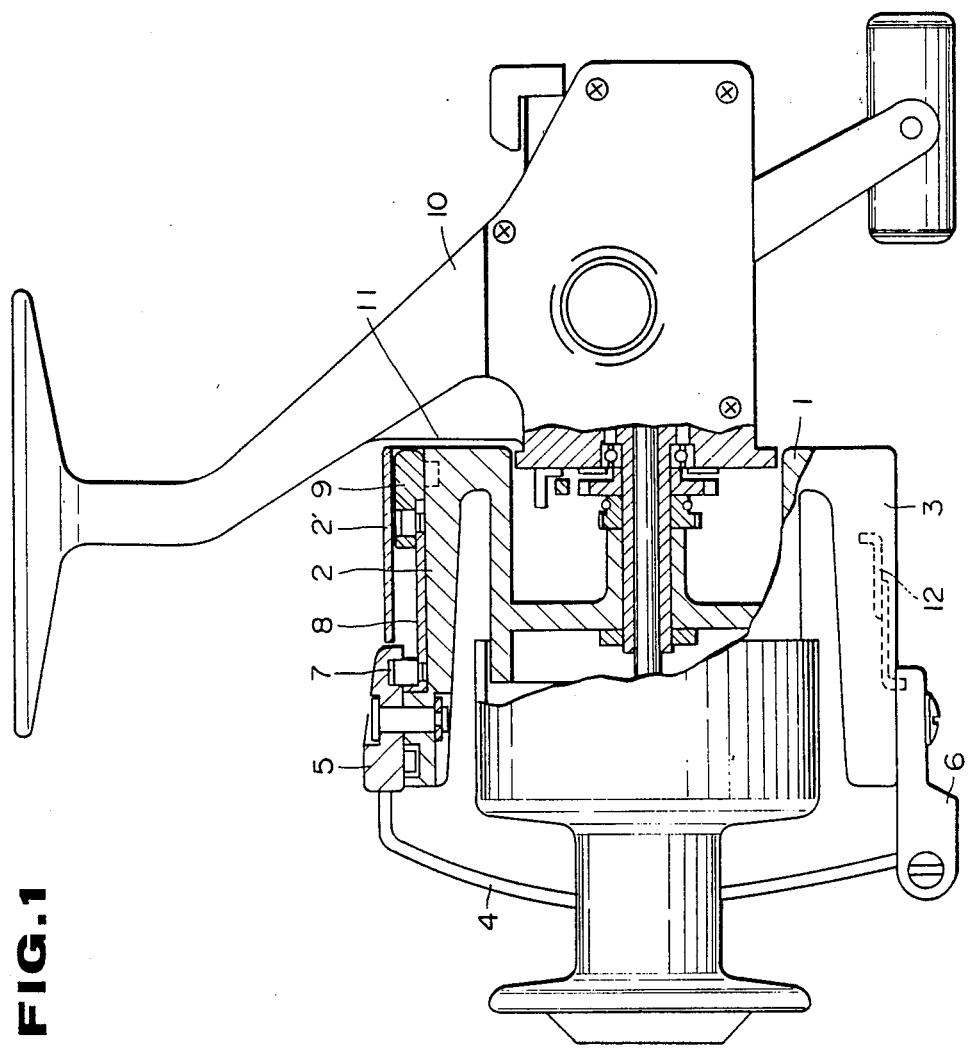
FIG. 1 is a front view of a first embodiment of the invention partly cut away.
Figure 2:
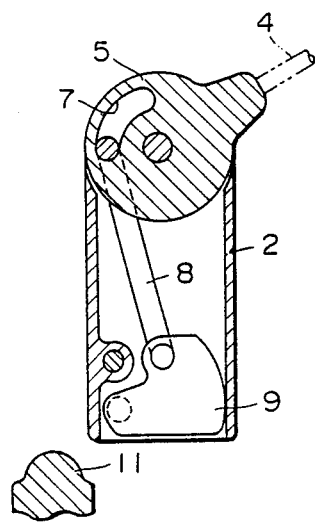
FIG. 2 is a lateral cross section of an essential part of FIG. 1 with a line reeled up.

Embodiments of the invention will now be explained by referring to the attached drawings. On each side of a rotor 1 of the spinning reel are integrally formed bail support arms 2, 3 which have bail support members 5, 6 rotatably supported at their front ends. A working rod 8 is engaged through a long groove 7 with the periphery of one bail support member. The other end of the working rod 8 is engaged with a kick member 9 which is rotatably mounted on the base of the bail support arm 2. When the bail 4 is in a reel-up position, the kick member 9 is retracted into the bail support arm as shown in FIG. 2. When the bail is in a reel-off position, the kick member 9 partly projects from the base end surface of the bail support arm 2 as shown in FIG. 3.

The reel body 10 is provided with an abutting member 11 for resetting the kick member 9. The bail support arm 3 is provided with a dead point spring 12 for selectively urging the bail 4 toward either the reel-up position or the reel-off position.

Figure 3:
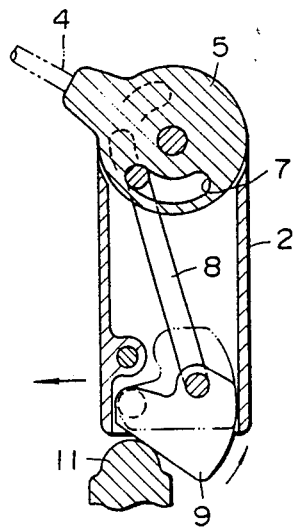
FIG. 3 is a lateral cross section of an essential part of FIG. 1 with a line reeled off.

When a line is to be released, the bail 4 is manually turned from the reel-up position of FIG. 2 to the reel-off position of FIG. 3. When the line is to be wound up, the rotor 1 is turned by a handle operation. The kick member 9 projecting from the base end surface of &he bail support arm 2 is then struck by the abutting member 11 and rotated, with the result that the working rod 8 causes the bail support member 5 to return to the reel-up position of FIG. 2.

Figure 4:
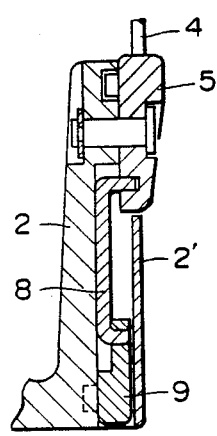
FIGS. 4 through 8 are vertical cross sections of an essential part of another embodiment of the invention.
Figure 5:
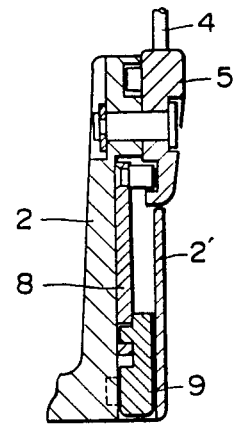
Figure 6:
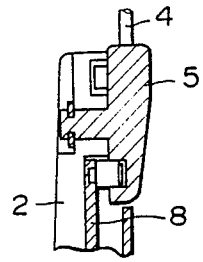

In the embodiment shown in FIG. 4, the working rod 8 is formed integral with the bail support member 5 and the kick member 9. In the case of FIG. 5, the working rod 8 is connected with the bail support member 5 through a pin and with the kick member 9 through a projection of the kick member 9 inserted into an opening of the working rod 8. In the case of FIG. 6, the bail support member 5 is formed integral with a projecting shaft which is rotatably supported on the bail support arm 2.

Figure 7:
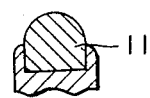
Figure 8:
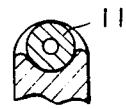

As examples of the abutting member 11 for resetting the kick member 9, FIG. 7 shows one formed of a material different from that of the reel body 10; and FIG. 8 shows a rotating roller fitted to the reel body 10 for reduced rotating resistance.

Figure 9:
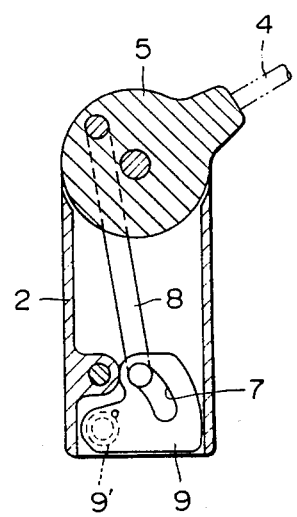
FIG. 9 is a lateral cross section of an essential part of a still another embodiment of the invention.

In the embodiment of FIG. 9, the working rod 8 is engaged without play with the bail support member 5 and with the kick member 9 through a slot 7'. The kick member 9 is also urged by a spring 9' in the counterclockwise direction.

Figure 10:
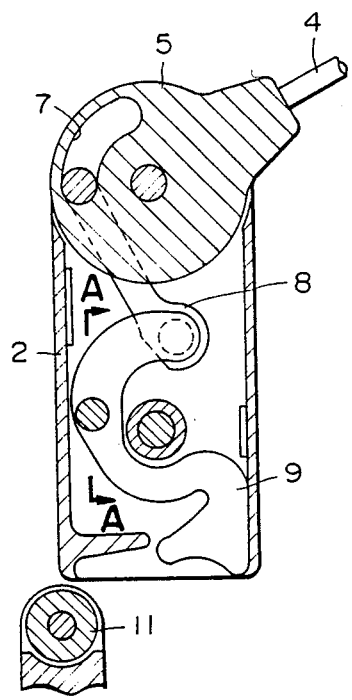
FIG. 10 is a lateral cross section of a further embodiment of the invention with a line reeled up.
Figure 11:
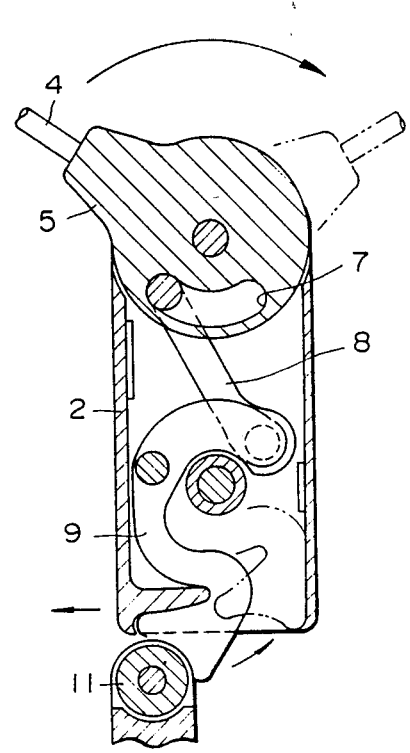
FIG. 11 is a lateral cross section of FIG. 10 with a line reeled off.
Figure 12:
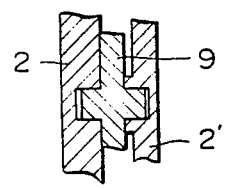
FIG. 12 is a cross section taken along the line A—A of FIG. 10.
Figure 13:
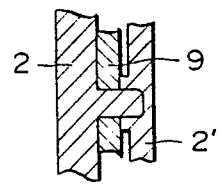
FIG. 13 is a cross section of a rotatably supported kick member of a further embodiment of the invention.

In the embodiments of FIG. 10 and 11, the kick member 9 is rotatably mounted at almost the center of the bail support arm 2 to elongate the distance from the pivoting point to the abutting portion, and thereby reduce a force required when reversing from the reel-off state to the reel-up state by means of the action of levers.

While in the preceding embodiments, the working rod 8 is connected at both ends with the bail support member 5 and the kick member 9 through either a long groove 7 or a slot 7', the long groove and slot may be omitted.

Figure 14:
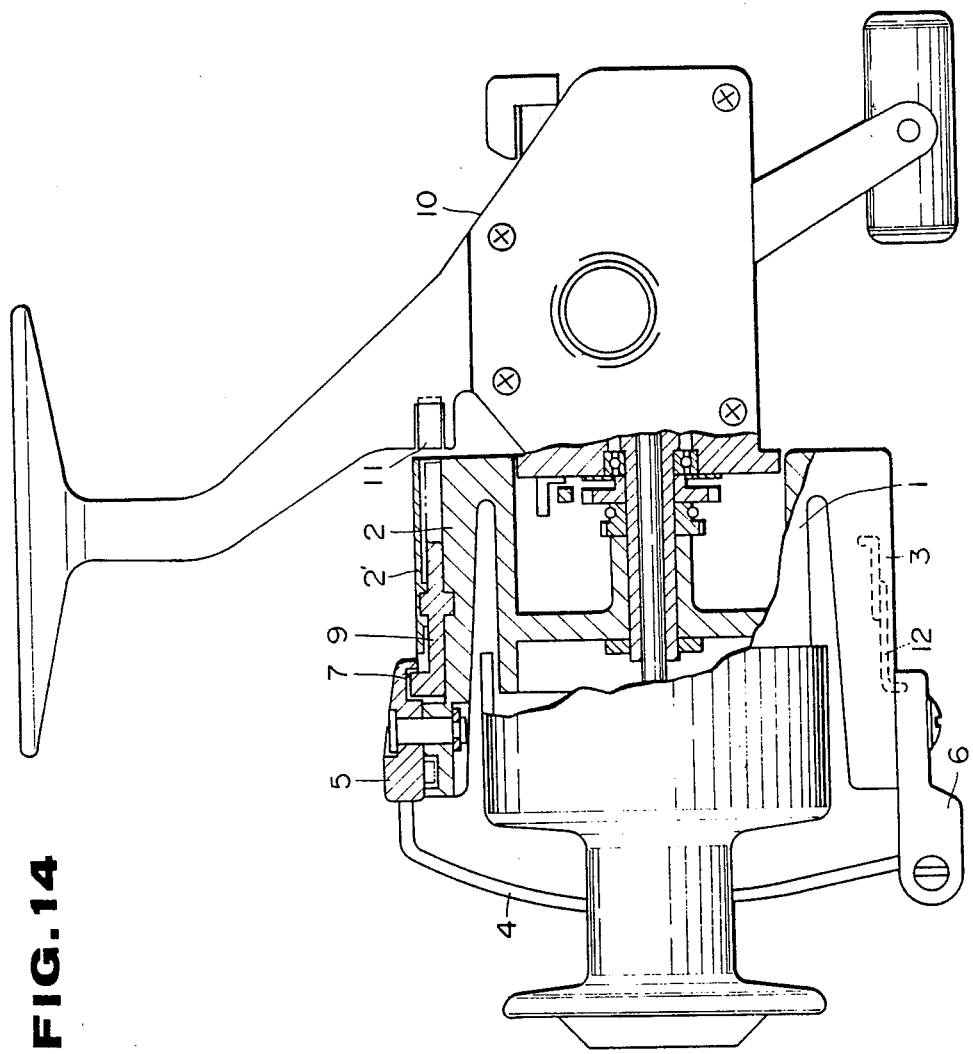
FIG. 14 is a plan view of a still further embodiment of the invention partly cut away.
Figure 15:
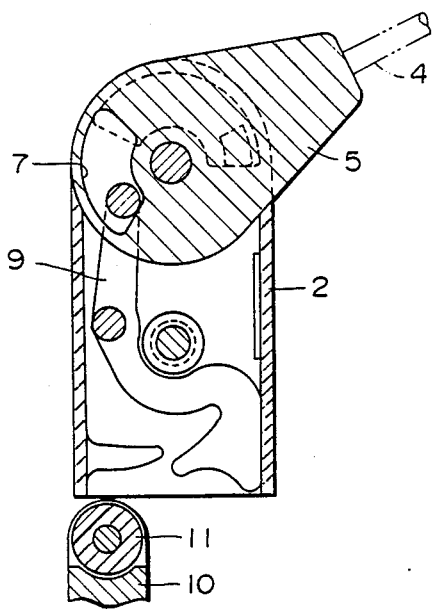
FIG. 15 is a lateral cross section of an essential part of FIG. 14 with a line reeled up.
Figure 16:
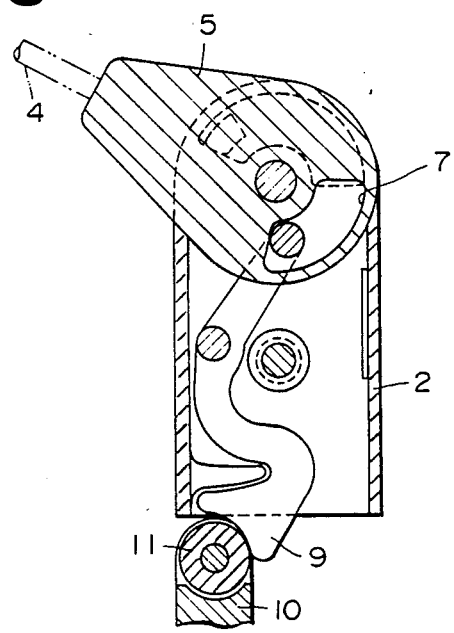
FIG. 16 is a lateral cross section of an essential part of FIG. 14 with a line reeled off.

FIGS. 14 to 16 show a still further embodiment in which the working rod is omitted and the kick member 9 is directly engaged with the bail support member 5.

That is, the almost central part of the kick member 9 is rotatably mounted on the bail support arm 2. The kick member 9 has one end engaged with the long groove 7 of the bail support member 5 and the other end projectable from the base end surface of the bail support arm 2. This simples the structure of the reversing mechanism which, in addition to the abutting member 11, requires only the kick member 9 to be rotatably mounted on the bail support arm 2. With this simplified construction, the number of parts is reduced and therefore the rotor can be made smaller in size and weight. Reference numeral 2' represents a cover of the bail support arm 2.

We claim:

1. A bail reversing apparatus mounted on the body of a spinning reel for fishing reels comprising
    a rotor connected to the body of the spinning reel;
    a bail support arm provided on said rotor;
    a bail support member rotatably mounted on a front end of said bail support arm and urged distributedly to a reel-up position and a reel-off position and held by a spring member;
    a working rod having one end engaged with said bail support member;
    a kick member engaged with an other end of said working rod;
    said kick member rotatably mounted on said bail support arm with said kick member partly projectable from a base end surface of said bail support arm wherein a projection on said working rod connected to one of said kick or bail support members is made to engage with a circular-arc-shaped long groove provided on the other of said members;
    and an abutting member providing on said reel body for abutting against said projecting kick member to reset said kick member, located at a projected extension of a base end of said ball support arm
    whereby when said bail support member is in the reel-up position, said kick member is retracted into said bail support arm, and when said bail support member is in the reel-off position, said kick member projects from the base end surface of said bail support arm.

2. The bail reversing apparatus of claim 1 wherein
    a shaft within said bail support arm has said kick member rotatably mounted on said shaft within said bail support arm for movement parallel to the cylindrical plane of revolution of said bail support arm.

3. A bail reversing apparatus mounted on the body of a spinning reel for fishing reels comprising
    a rotor connected to the body of the spinning reel;
    a bail support arm provided on said rotor;
    a bail support member rotatably mounted on a front end of said bail support arm and urged distributedly to a reel-up position and a reel-off position and held by a spring member;
    a kick member rotatably mounted at a substantially central part of said bail support arm, said kick member having one end engaged with said bail support member wherein a projection on one of said kick or bail support members is made to engage directly with a circular-arc-shaped long groove provided in the other of said members;
    and an abutting member provided on said reel body for abutting against said projecting kick member to reset said kick member, located at a projected extension of a base end of said bail support arm
    whereby when said bail support member is in the reel-up position, said kick member is retracted into said bail support arm, and when said bail support member is in the reel-off position, said kick member projects from the base end surface of said bail support arm.

4. The bail reversing apparatus of claim 3 wherein
    said kick member is rotatably mounted on said bail support arm with said kick member partly projectable from a base end surface of said bail support arm.

5. The bail reversing apparatus of claim 3 wherein
    a shaft within said bail support arm has said kick member rotatably mounted on said shaft within said bail support arm for movement parallel to the cylindrical plane of revolution of said bail support arm.